Oct. 6, 1959      T. B. DALTON      2,907,583
FIFTH WHEEL STRUCTURE

Filed Jan. 17, 1958      2 Sheets-Sheet 1

INVENTOR.
THOMAS B. DALTON
BY
ATTORNEYS

Oct. 6, 1959  T. B. DALTON  2,907,583
FIFTH WHEEL STRUCTURE
Filed Jan. 17, 1958  2 Sheets-Sheet 2
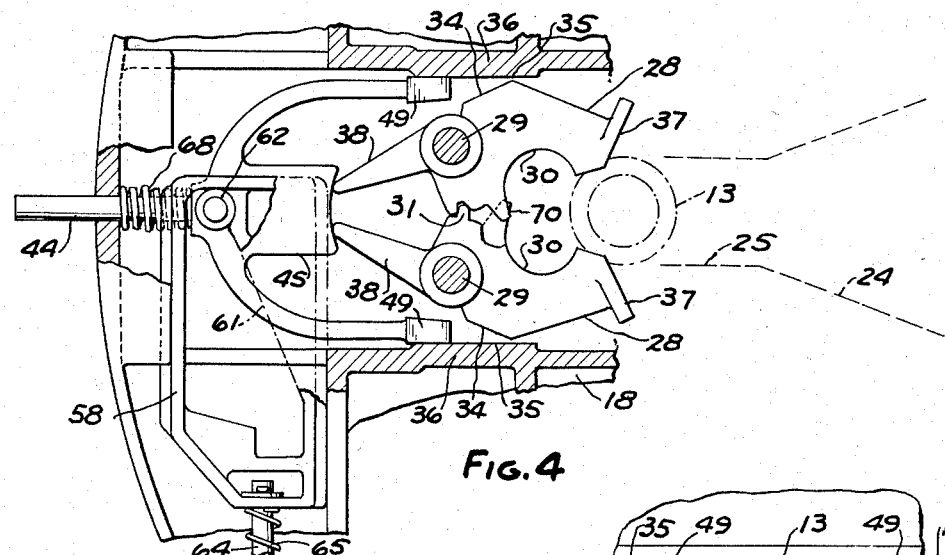
FIG. 4
FIG. 6
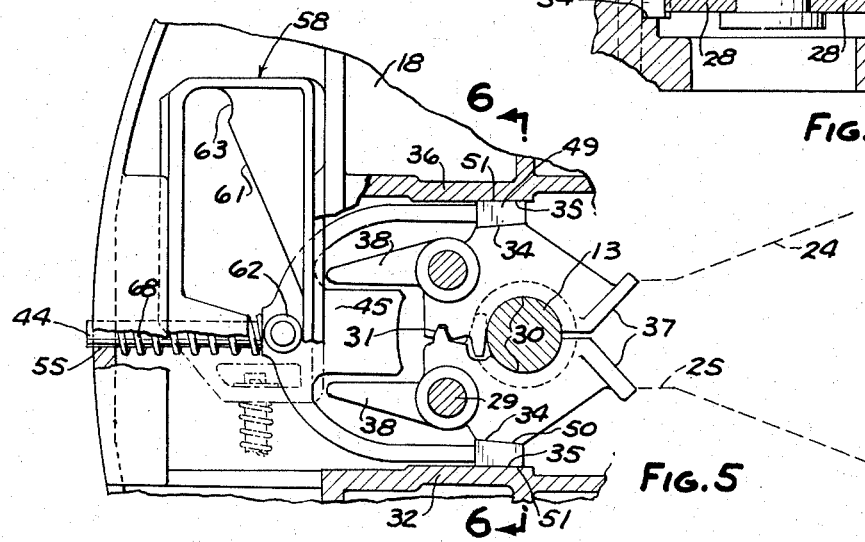
FIG. 5
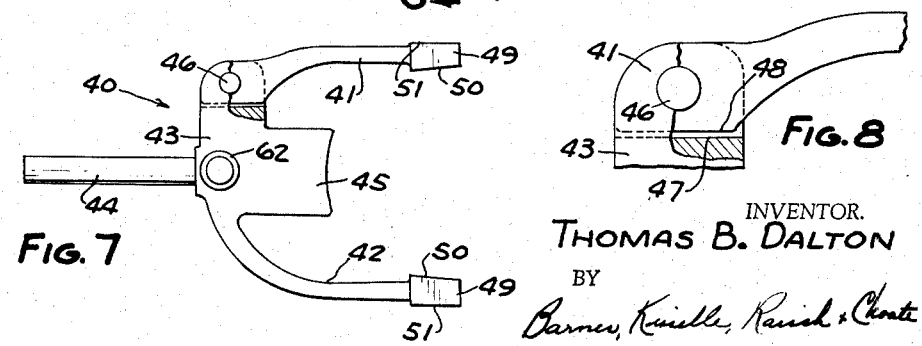
FIG. 7
FIG. 8
INVENTOR.
THOMAS B. DALTON
BY
Barnes, Kisselle, Raisch & Choate
ATTORNEYS.

United States Patent Office 2,907,583
Patented Oct. 6, 1959

2,907,583

FIFTH WHEEL STRUCTURE

Thomas B. Dalton, Muskegon, Mich., assignor to West Michigan Steel Foundry Co., Muskegon, Mich., a corporation of Michigan Application January 17, 1958, Serial No. 709,638

6 Claims. (Cl. 280—435)

The fifth wheel of this invention is adapted for use in tractor and semi-trailer combinations wherein the forward end of the semi-trailer has an upper fifth wheel plate detachably supported on a lower fifth wheel plate mounted on the tractor. The upper plate has a depending kingpin releasably clamped between openable jaws on the lower plate. The lower plate is provided with a movable yoke having elements which can be retractably wedged between the jaws and stationary or backup portions of the lower plate to lock the jaws around the kingpin.

Heretofore, the U-shaped yoke has had generally rigid unitary construction and the locking elements on the yoke legs have been provided with wedge shaped enlargements which fit wedgingly between the jaws and adjacent portions of the lower plate. This construction is subject to malfunctioning where the backup portions have irregular or nonparallel surfaces or where the legs of the yoke are misaligned such as where they are sprung toward or away from each other. Considerable time consuming and expensive adjusting and fitting is frequently required during manufacture and subsequently to insure that the yoke legs properly wedge between the jaws and plate surfaces for locking the jaws closed.

An object of this invention is to provide a simple, inexpensive yoke structure improved to wedgingly lock the jaws closed despite irregularities and variations of position of the lower fifth wheel plate surfaces and yoke elements.

The invention is carried out generally by pivotally mounting the yoke legs so that they can move toward and away from each other and thereby find their proper wedge-locking positions. The pivoted portions are also provided wtih relatively closely spaced surfaces which interengage to limit pivoting movement of the yoke legs to a relatively small range so that the yoke retains its U shape when retracted from its jaw locking position. One form of the invention is shown in the accompanying drawings.

Figure 4 is an enlarged fragmentary bottom plan view illustrating the kingpin jaws in open condition.

Figure 5 is similar to Figure 4 but illustrating the kingpin jaws locked around a kingpin.

Figure 6 is a sectional view on line 6—6 of Figure 5.

Figure 7 is a view of a locking yoke according to this invention separate from the rest of the parts.

Figure 8 is an enlarged fragmentary view illustrating detail at the pivoted portions of the locking yoke.

Figure 1:
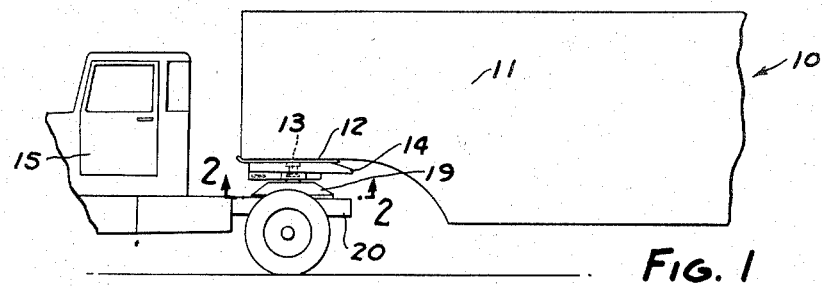
Figure 1 is a fragmentary elevational view illustrating a tractor and semi-trailer combination connected by a fifth wheel in which the present invention may be embodied.

Shown in Figure 1 is a tractor and semi-trailor combination 10 in which the forward end of semi-trailer 11 is provided with an upper fifth wheel plate 12 having a depending kingpin 13 detachably secured to a lower fifth wheel member 14 mounted on a tractor 15. The lower fifth wheel member includes a plate 18 rockably mounted on base members 19 which in turn are secured to the tractor frame 20. Plate 18 has rearward extensions 22 having angled upper surfaces 23 forming ramps for receiving upper fifth wheel plate 12. Extensions 22 have inner surfaces 24 which converge for guiding kingpin 13 into a relatively narrow opening 25.

A pair of jaws 28 are pivotally mounted on plate 18 through pins 29. The jaws have opposed generally semi-circular portions 30 which lockingly close around a kingpin 13 and the jaws have portions forming interengaging teeth illustrated at 31 arranged so that the jaws will open and close in unison. Each jaw is provided at an outer edge with a surface 34 which, in the closed position of the jaws, is angled to surface 35 formed on a stationary part of lower fifth wheel plate 18 and in the form of the invention illustrated, this part comprises a downwardly extending reinforcing rib 36. The jaws have forwardly disposed divergent portions 37 and rearward extensions 38 for purposes to be described.

A yoke 40 is provided for releasably locking jaws 28 around a kingpin 13. The yoke is generally U-shaped having leg portions 41 and 42 decurrent into a base portion 43 having a rearward rod 44 and a forward tongue 45. Leg 41 is pivoted on base 43 as at 46 so that it can swing toward and away from leg 42. Base 43 and leg 41 have apposed surfaces 47 and 48 respectively disposed laterally of pivot 46. Surfaces 47 and 48 are spaced relatively closely together to limit the swinging movement of leg 41 to a relatively small range of movement. Each leg 41 and 42 has an enlargement 49 at its end with an inner surface 50 disposed at an angle to its outer surface 51 so that enlargements 49 are generally wedge-shaped. These enlargements fit wedgingly between surfaces 34 and 35 on jaws 28 and rib 36 respectively to lock jaws 28 around a kingpin 13.

Figure 3:
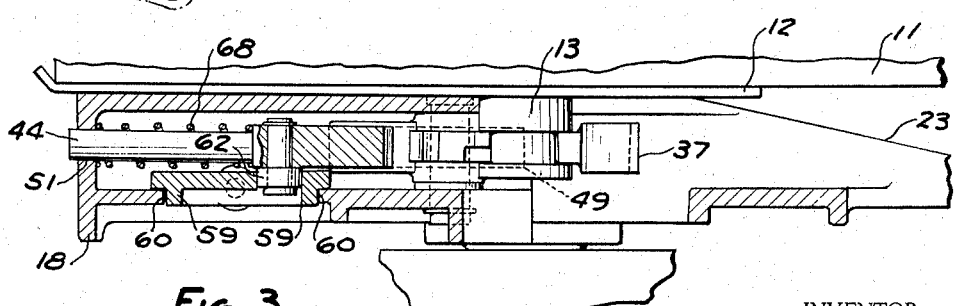
Figure 3 is an enlarged sectional view on line 3—3 of Figure 2.

Yoke 40 is slidably supported at its forward portion by engagement of leg enlargements 49 on shoulders 54 provided on plate 18 and is slidably supported at its rearward portion by projection of rod 44 through an aperture 55 in plate 18 (Figure 3). When yoke 40 is advanced, legs 41 and 42 straddle jaws 28 for locking them closed (Figure 5) and when the yoke is retracted (Figure 4) the legs clear the jaws so that they can be opened.

A yoke operating slide 58 comprises a frame having side members 59 slidable in suitable ways 60 extending in a direction generally perpendicular to the direction of movement of yoke 40. Slide 58 has an inclined ramp member 61 which engages a roller 62 on yoke 40 and which terminates in a depression 63. Slide 58 has an operating handle 64 around which is a coil spring 65 seating against a stationary portion 66 of plate 18 to bias the slide toward jaw-locking position of yoke 40. A coil spring 68 around yoke bar 44 seats against base 43 of the yoke and reacts against a stationary portion of plate 18 for urging the yoke toward its advanced or jaw-locking position.

Figure 2:
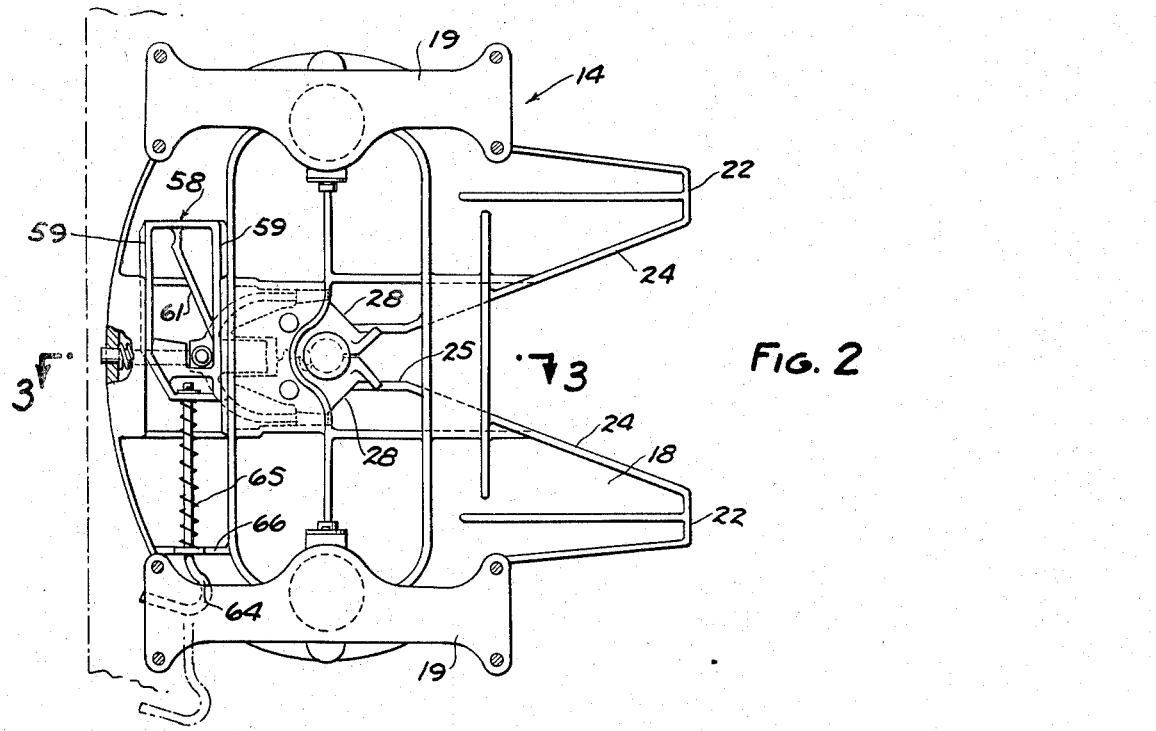
Figure 2 is an enlarged bottom plan view of a fifth wheel structure embodying this invention.

In use, it may be assumed that initially semi-trailer 11 is disconnected from tractor 15. Operating handle 64 has been pulled outwardly, that is downwardly as Figures 2, 4, and 5 are viewed, so that roller 62 has been cammed to the left to withdraw yoke 40 from engagement with jaws 28 so that the latter may be opened for receiving kingpin 13. Roller 62 is engaged in recess 63 at the end of ramp 61 under the action of spring 68 to form a detent for holding the slide and yoke in the Figure 4 position against the action of spring 65.

Tractor 15 is backed under the forward end of trailer 11 while the latter is held stationary so that upper fifth wheel plate 12 rides up ramp portions 23 of the rearward projections 22 on lower fifth wheel 18 and kingpin 13 is guided by converging surfaces 24 and opening 25 to jaws 28. The kingpin continues between the jaws and strikes portions 70 thereof (Figure 4), thereby levering the jaws closed around the kingpin. Operating handle 64 is manually or otherwise forced inwardly, that is upwardly as Figures 2, 4 and 5 are viewed, to dislodge yoke roller 62 from detent recess 63 and spring 65 then forces slide 58 inwardly to permit roller 62 to ride down ramp 61 so that yoke 40 advances to the right under the action of spring 68.

In this advancing movement, the wedge-shaped elements 49 on the ends of the yoke legs are inserted forcibly in the complementary wedge-shaped spaces defined by angled surfaces 34 on jaws 28 and surfaces 35 on stationary rib 36. This wedgingly locks jaws 28 in closed relation around kingpin 13. This position of the parts is shown in Figure 5. Forward tongue 45 of the yoke now projects between tail extensions 38 on jaws 28 to further insure against sufficient opening of the jaws to permit withdrawal of the kingpin.

In some situations, surfaces 35 may have irregularities or may be slightly out of parallel as a result of ordinary manufacturing processes. For similar reasons, surfaces 50 and 51 on enlargements 49 may have certain irregularities. These irregularities may also arise during the course of normal use of the fifth wheel structure which is subject to relatively large stresses and which is subject to abrasive matter such as dust, mud, and the like. In prior structures which utilized a rigid U-shaped yoke, the legs of the U were subject to variations in alignment, causing variations in the placement of the locking elements. These factors tend to cause insecure or incomplete wedging of elements 49 in the spaces between the jaws and rib 36.

It is important to note that this possibility is eliminated by the fact that yoke legs 41 and 42 can move toward and away from each other. When yoke 40 is advanced, wedge-shaped elements 49 are free to move laterally so that they seek and find their proper wedging positions between the jaws and ribs. Thus the necessity for expensive fitting, adjusting, and machining of the wedging parts is eliminated. A great deal of time and work in obtaining a proper fit between the parts is saved and the fifth wheel structure is less expensive to build.

To unlock jaws 28 from around kingpin 13, operating handle 64 is withdrawn outwardly or downwardly as Figures 2, 4, and 5 are viewed against the action of spring 65. Roller 62 on the yoke rides up ramp 61, thereby retracting the yoke against the action of spring 68 so that elements 49 are withdrawn from the wedge-shaped space between jaws 28 and ribs 36. When the yoke is withdrawn sufficiently so that the legs clear the jaws, roller 62 snaps into depression 63 and the yoke is retained in retracted position as described. This position of the parts is shown in Figure 4. Tractor 15 may now be driven forwardly while semi-trailer 11 is held stationary to withdraw kingpin 13 from between jaws 28 which swing aside relatively freely to permit kingpin egress. In retracted position of the yoke, tongue 45 is clear of tail pieces 38 on jaws 28 so that they are free to swing inwardly. The forward end of tongue 45 may be concaved as illustrated to clear the tail pieces.

In the retracted position of yoke 40, surfaces 47 and 48 interengage to prevent any excessive unintentional swinging movement of leg 41 so that the legs and base 43 retain their generally U-shape. Thus when the yoke is again released for advancing into jaw locking position, wedges 49 are still properly positioned for insertion into the wedge-shaped spaces between the jaws and ribs 36. To again attach tractor 15 to trailer 11, the tractor is backed under the stationary trailer so that kingpin 13 enters jaws 28 which may then be locked in position as described.

I claim:

1. In a lower fifth wheel member having jaws movable for opening and closing around a king pin on an upper fifth wheel member and having a U-shaped yoke with wedges on its legs for wedging insertion between the jaws and stationary portions of the lower fifth wheel member, the improvement which comprises means mounting said legs for movement relative to each other so that said wedges can find their proper jaw-locking positions when inserted between the jaws and stationary portions.

2. In a lower fifth wheel member having jaws movable for opening and closing around a king pin on an upper fifth wheel member and having a U-shaped yoke with wedges on its legs for wedging insertion between the jaws and stationary portions of the lower fifth wheel member, the improvement which comprises means mounting said legs for movement relative to each other so that said wedges can find their proper jaw-locking positions when inserted between the jaws and stationary portions, and means limiting relative movement of said legs to a relatively small range of movement so that said legs retain their general relative positions when withdrawn from jaw-locking position to facilitate reinsertion of said wedges in their jaw-locking positions.

3. The structure defined in claim 1 wherein said mounting means includes a pivotal connection between one of said legs and the base portion of said yoke.

4. The structure defined in claim 3 wherein said one leg and said base portion are provided with apposed surfaces displaced laterally of said pivotal connection, said surfaces being spaced apart to facilitate relative movement between said one leg and base portion but being relatively close to each other to interengage and limit relative movement between said one leg and base portion to a relatively small range of movement, whereby to retain the general relative positions of said wedges, when withdrawn from jaw-locking position, to facilitate reinsertion of said wedges in their jaw-locking positions.

5. In a lower fifth wheel member having jaws movable for opening and closing around a king pin on an upper fifth wheel member and having wedge elements for wedging insertion between the jaws and stationary portions of the lower fifth wheel member, the improvement which comprises means mounting said wedge elements for movement toward and away from each other so that said wedge elements can find their proper jaw-locking positions when inserted between the jaws and stationary portions.

6. The structure defined in claim 5 wherein means are provided limiting relative movement of said wedge elements toward and away from each other to a relatively small range of movement so that said wedge elements retain their general relative positions when withdrawn from jaw-locking position to facilitate reinsertion of said wedge elements in their jaw-locking positions.

References Cited in the file of this patent

UNITED STATES PATENTS

| | | |
|---|---|---|
| 2,469,279 | Seyferth | May 3, 1949 |
| 2,663,575 | Ketel | Dec. 22, 1953 |